Figure 1:
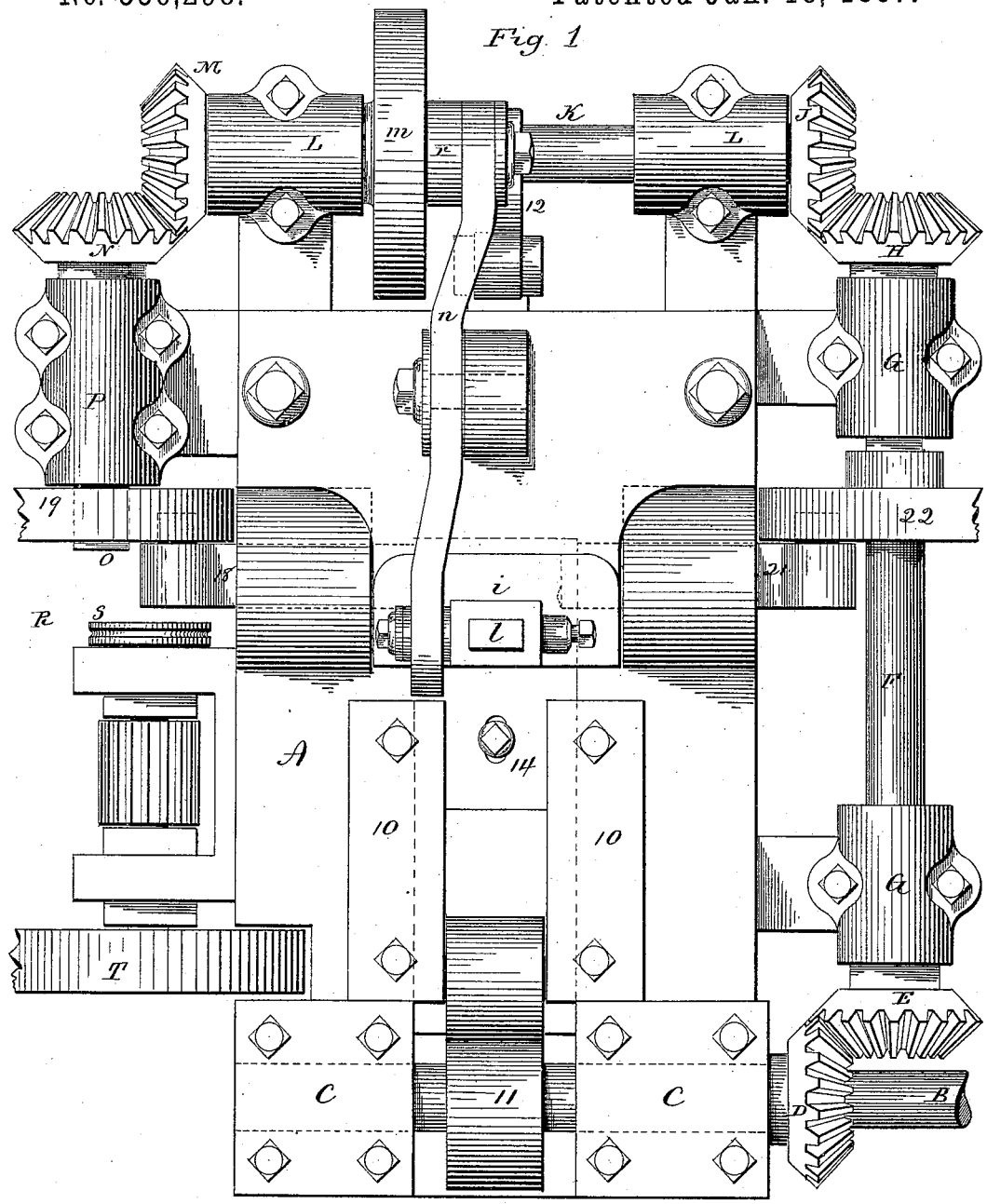

(No Model.) 4 Sheets—Sheet 1.

J. ADT.
MACHINE FOR MAKING WIRE BOX AND COVER FASTENERS.

No. 356,298. Patented Jan. 18, 1887.

Witnesses
J. H. Shumway
Fred C. Earle

John Adt,
Inventor
By Atty (No Model.) 4 Sheets—Sheet 2.
J. ADT.
MACHINE FOR MAKING WIRE BOX AND COVER FASTENERS.
No. 356,298. Patented Jan. 18, 1887.
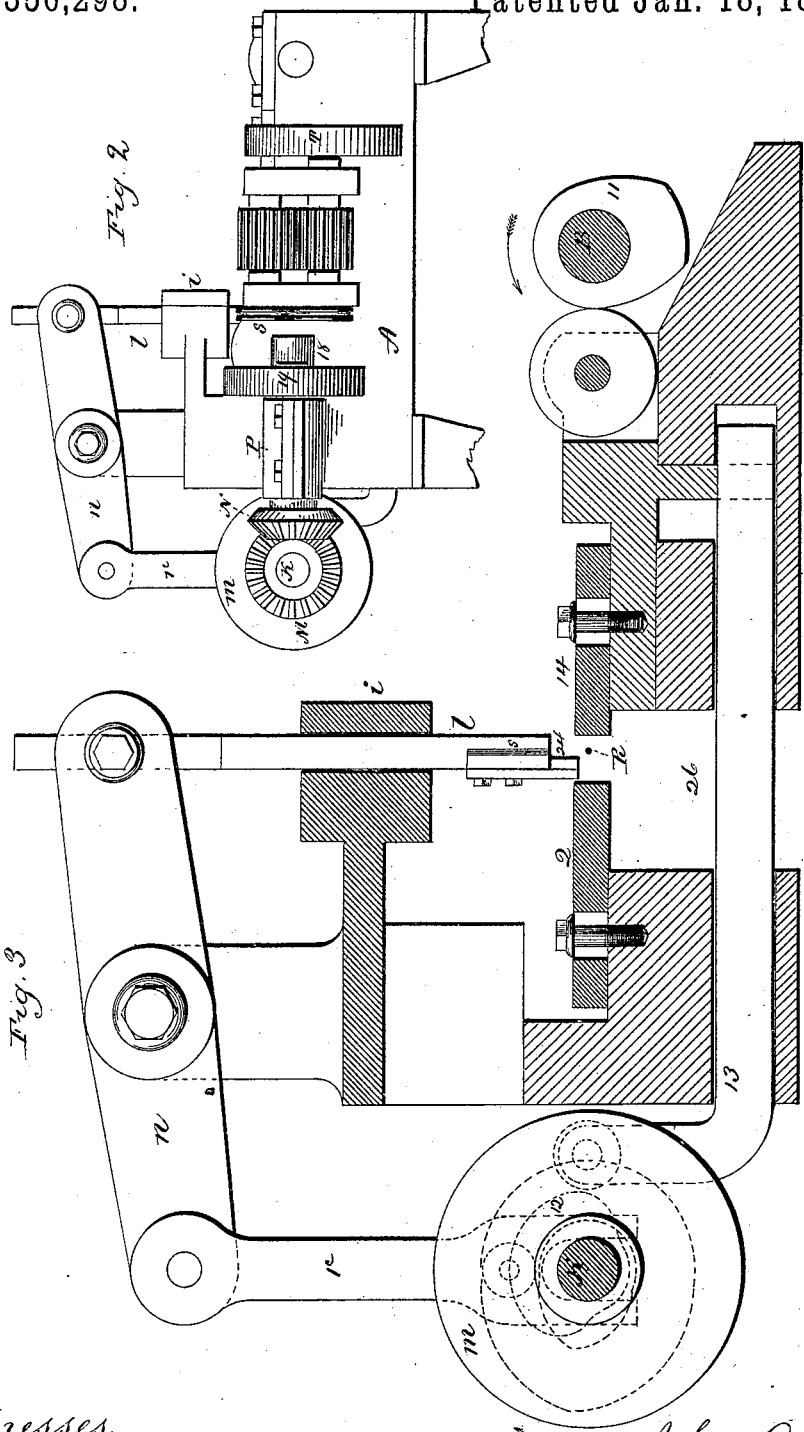

(No Model.) 4 Sheets—Sheet 3.
J. ADT.
MACHINE FOR MAKING WIRE BOX AND COVER FASTENERS.
No. 356,298. Patented Jan. 18, 1887.
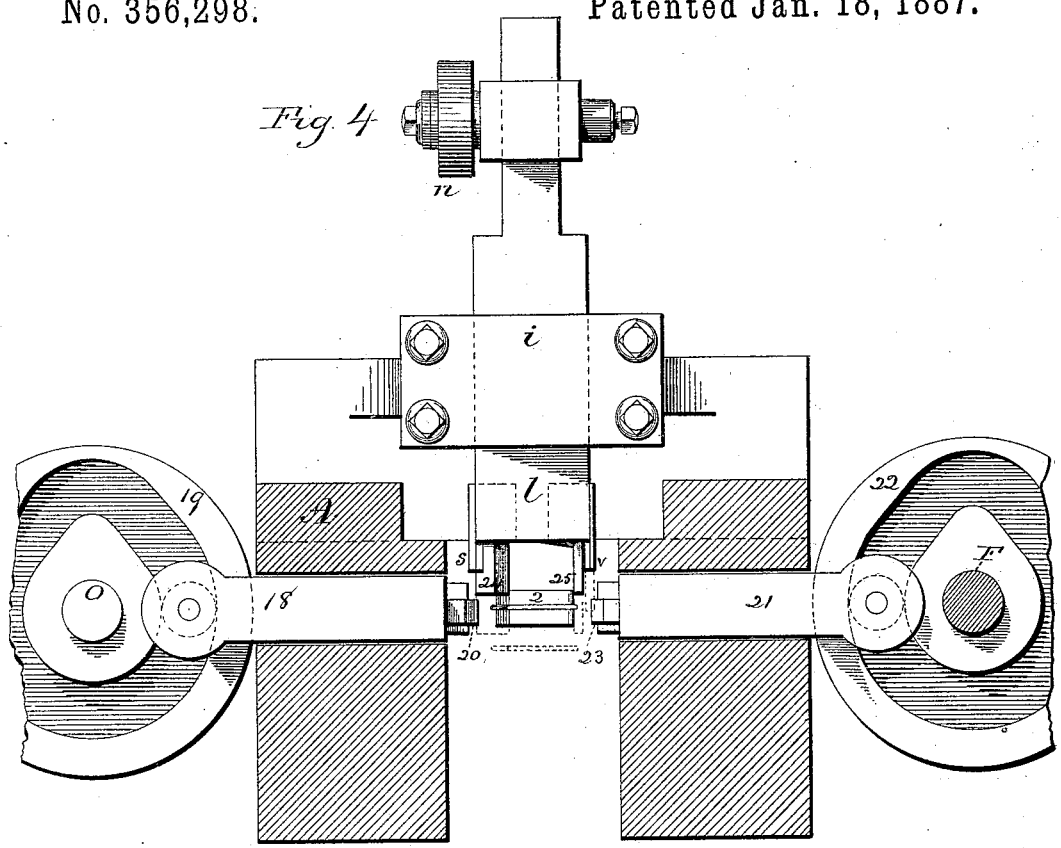
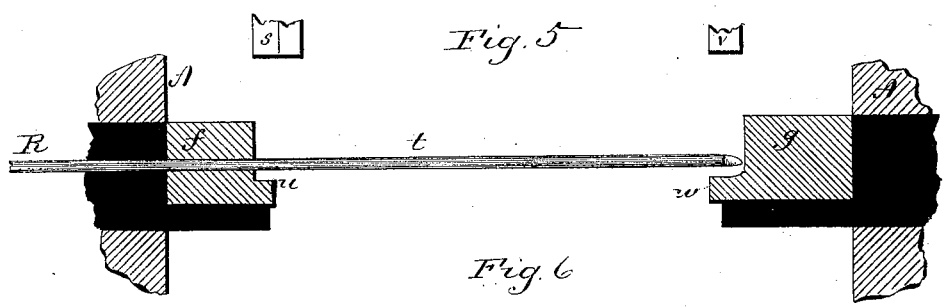
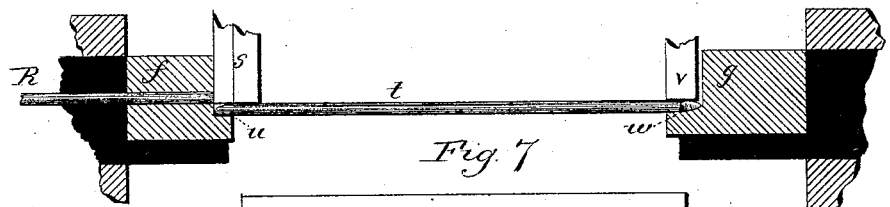
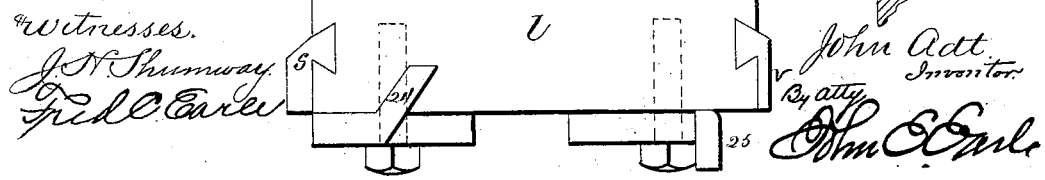
Witnesses.
J. N. Shumway
Fred C. Earle
John Adt,
Inventor
By atty
John C. Earle (No Model.) 4 Sheets—Sheet 4.
J. ADT.
MACHINE FOR MAKING WIRE BOX AND COVER FASTENERS.
No. 356,298. Patented Jan. 18, 1887.
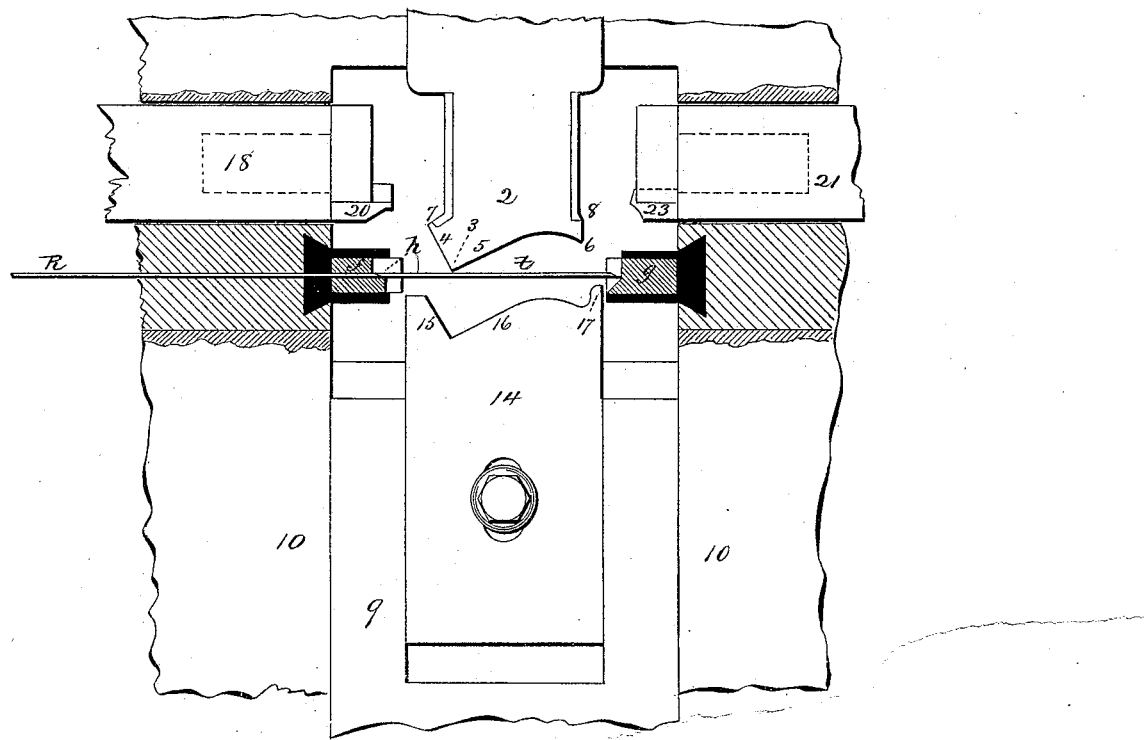
Fig. 8
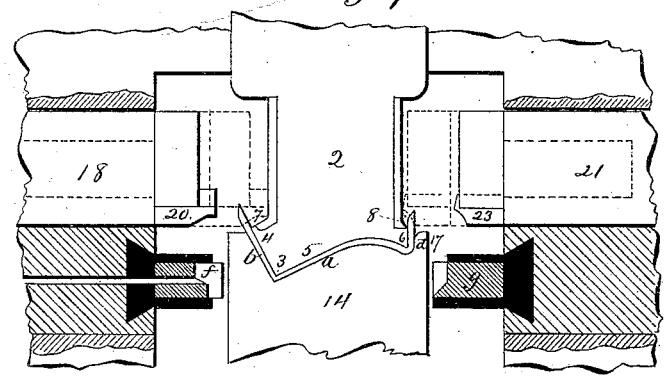
Fig. 9
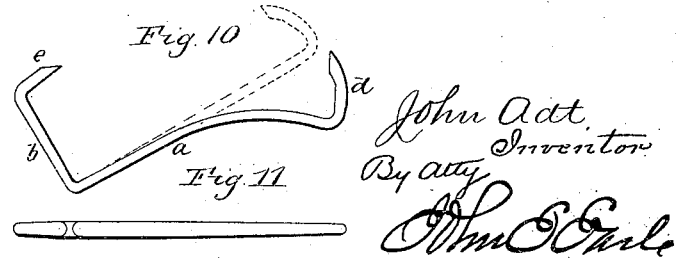
Fig. 10
Fig. 11
Witnesses
J. H. Shumway
Fred C. Earle
John Adt, Inventor
By atty
John C. Earle
N. PETERS, Photo-Lithographer, Washington, D. C.

UNITED STATES PATENT OFFICE.

JOHN ADT, OF NEW HAVEN, CONNECTICUT.

MACHINE FOR MAKING WIRE BOX AND COVER FASTENERS.

SPECIFICATION forming part of Letters Patent No. 356,298, dated January 18, 1887.

Application filed November 23, 1886. Serial No. 219,605. (No model.)

*To all whom it may concern:*

Be it known that I, JOHN ADT, of New Haven, in the county of New Haven and State of Connecticut, have invented a new Improvement in Machines for Making Box and Cover Fasteners; and I do hereby declare the following, when taken in connection with the accompanying drawings and the letters of reference marked thereon, to be a full, clear, and exact description of the same, and which said drawings constitute part of this specification, and represent, in—

Figure 1, a top view; Fig. 2, a side view, looking toward the feed, on a reduced scale; Fig. 3, a longitudinal section showing side view of the vertical slide 1; Fig. 4, a transverse section cutting between the two dies 2 and 14, and looking toward the die 2; Figs. 5 and 6, transverse vertical sections enlarged to illustrate the method of cutting, and the rests to support the blank after it is cut; Fig. 7, an under side view of the slide 1, looking up, showing the cutter, presser, and the delivering projections; Figs. 8 and 9, detached views enlarged, illustrating the operation of the formation of the fastener; Fig. 10, an edge view, and Fig. 11 a side view, of the fastener, full size.

This invention relates to a machine for manufacturing the "box and cover fastener" for which Letters Patent of the United States No. 344,691 were granted to Almer B. Thomas, June 29, 1886, the object being to construct a machine which, receiving the wire from the coil, will cut the required length of wire, form the points, bend it into the required shape, and discharge it from the machine complete.

This fastener is illustrated in Figs. 9 and 10, and consists of two arms, $a\, b$, bent at right angles to each other, the arm $a$ terminating in a barb $d$, and the arm $b$ terminating in a similar barb, $c$. The arm $a$ is curved toward the barb $d$, so as to take that barb out of the natural plane of the arm, and so that the arm $b$, placed over the top of the cover, the arm $a$ extending down upon the side of the box or tub, the barb $d$ will clear the side, and so as to permit the barb $e$ to be driven into the top. Then, after the barb $e$ has been so driven into the top, to bring the arm $b$ hard down upon the top. Then the barb $d$ is driven into the side of the box or tub, bringing the arm $a$ into a straight line, or to conform to the surface of the side of the tub or box, and as indicated in broken lines, Fig. 9.

The fastener is made from wire of a diameter to conform to the size and strength of the fastener required, and the arms are flattened from the angle toward the barbs, but leaving the barbs the full diameter of the wire, the extreme ends of the barbs being pointed, so as to be readily driven.

I will now proceed to describe an automatic machine for producing these fasteners complete and ready for use.

A represents the bed of the machine, upon which the operative mechanism is placed.

B represents the main or driving shaft, which is supported in bearings C C, and to which power is applied by a pulley or gearing in a well-known manner, but not shown. This driving-shaft extends across one end of the machine, and carries a bevel-gear, D, which works into a corresponding bevel-gear, E, on one end of a shaft, F, along one side of the machine and at right angles to the shaft B, supported in bearings G G. At the other end of the shaft F is a like bevel-gear, H, which in its turn works into a like bevel-gear, J, on the end of a shaft, K, supported in bearings L L at the opposite end of the machine and parallel to the driving-shaft B. Upon the other end of the shaft K is a like bevel-gear, M, which in its turn works into a bevel-gear, N, on the end of a shaft, O, supported in a bearing, P, upon the opposite side of the machine to and parallel with the shaft F. The several gears correspond, so that the revolution communicated by the driving-shaft to the said shafts F, K, and O is the same as the driving-shaft.

The wire (represented by the line R) is fed into the machine by means of a pair of grooved feed-rolls, S S, these rolls being respectively fixed upon parallel shafts geared together, one of said shafts being driven by a pulley, T, and so that the wire passing between the two rolls, the friction between the rolls and the wire is sufficient to draw the wire into the machine when free; but when the wire meets a resistance to its advance greater than the friction between the rolls, then the wire stops and the rolls continue to revolve, slipping upon the wire. This is a common and well-known wire-feed, and for it may be substituted any other known feed which will at the proper time deliver to the machine the requisite length of wire. As the wire passes inward from the rolls it runs through the side of the machine and through a fixed die, *f*, (see Figs. 5, 6, and 8,) the wire continuing to move inward until its end abuts against an opposing fixed die, *g*, (see same Figs., 5, 6, and 8,) and when the end of the wire abuts against the die *g* its further run is arrested. The die *f* presents a cutting-surface, *h*, oblique to the axis of the wire, as seen in Fig. 8. Upon the bed is a vertical guide, *i*, in which a vertical slide, 1, is arranged, and in a position over the wire, thus standing between the cutting-die *f* and the fixed die *g*, (see Fig. 3,) R representing the wire. To this slide 1 a vertical reciprocating movement is imparted by means of a cam, *m*, on the shaft K through a rocking lever, *n*, one end of which is hung to the slide 1, and from the other end a connecting-rod, *r*, extends to the cam. The cam as represented is of a side-grooved character, with a stud projecting from the rod *r* into the groove of the cam, and as indicated in Fig. 3, and so that at each revolution of the shaft K a full reciprocating movement is imparted to the vertical slide 1. The vertical slide 1 carries upon its side next the cutting-die *f* a cutter, *s*, which corresponds in shape to the incline or bevel *h* of the die *f*, and as seen in Fig. 7, and so that while the wire rests, as before described, the slide 1 descends, the cutter *s* on the slide corresponding to the cutting portion *h* of the die *f* strikes the wire and cuts it diagonally, corresponding to the cutter *s* and the die, as seen in Fig. 8, thus producing a point on the piece which is cut off, and leaving the end of the body of the wire also pointed. In thus cutting the blank *t* (see Fig. 6) from the body of the wire it is forced downward upon a rest, *u*, below the cutter at that end, and upon a like rest, *w*, at the opposite end. In thus making the cut by a downward movement in the plane of the bevel the natural result is to turn the point of the body of the wire downward to some extent, and as indicated in Fig. 6. It is therefore advisable to bring this point of the body of the wire into a central position, and to do this the upper surface of the rest *w* is curved upward, as seen in Fig. 6, and so that as the point of the wire rests thereon, a presser, *v*, on the side of the slide 1 opposite the cutter, and corresponding substantially to the cutter, strikes the wire upon the rest *w* and forces it downward. The extreme point of the blank striking the upper surface of the rest is therefore turned upward and brought into a central line, as seen in Fig. 6, it being understood that the point of the blank on the rest *w* is the point produced by cutting the previous blank from the body of the wire. After having thus cut and brought the blank upon the rests *u w* the slide 1 rises, leaving the straight blank upon the rests, and as seen in Fig. 8.

Upon one side of the blank, which I call the "back side," and in the plane of the wire, is a stationary die, 2. The working-face of this die next the wire is of a shape corresponding to the interior of the fastener—that is to say, it presents an angle, 3, to the wire, this angle corresponding to the inner angle of the fastener. From the angle the sides 4 5 run obliquely to the line of the blank, the side 4 corresponding to the arm *b* of the blank. The side 5 at its other end curves toward the blank and terminates in an angle, 6, corresponding to the inner angle of the barb *d*. At the rear end of the side 4 a shoulder, 7, is formed, corresponding to the barb *e* of the fastener, and upon the opposite side of the die is a slightly-inclined shoulder, 8, corresponding to an inward bend, which is desirable for the barb *d*. Upon the opposite side of the blank is a slide, 9, arranged in guides 10 in a path at right angles to the axis of the wire fed into the machine. To this slide a reciprocating movement is imparted in one direction—that is, toward the fixed die 2—by a cam, 11, on the driving-shaft B, and is returned by a cam, 12, working through a bar, 13, in connection with the slide, as seen in Fig. 3, the cam being shown in broken lines in that figure, and so that the back and forward movements of the slide 9 are made positive. The slide 9 carries a die, 14, the face of which is in the plane of the fixed die 2, and the face of the die 14 corresponds to the exterior of the two arms *a b* of the fastener, 15 representing the face which corresponds to the arm *b* and 16 the face which corresponds to the arm *a*, these surfaces being oblique to the line of the blank, as shown, and upon the side of the die 14 is a projection, 17, corresponding to the angle of the barb *d*.

The blank *t* being between the two dies 2 and 14, as seen in Fig. 8, the die 14 advances toward the die 2 and strikes the blank and takes it from the rests *u w* and bends it across the angle 3 of the die 2 until the die 14 reaches its most advanced position, as seen in Fig. 9, when the blank is bent, and shapes the arms *a b* and turns the barb *b* into its proper relation to the arm *a*. At the same time the arms *a b* are flattened under the action of the corresponding surfaces of the two dies.

It now remains to form the barb *e* upon the arm *b* and to turn the end of the barb *d* inward. To perform these operations a slide, 18, is arranged in suitable guides in the machine in a path at right angles to the path of the die 14, and upon the side of the dies which form the arm *b*. To this slide 18 a reciprocating movement is imparted by a grooved cam, 19, on the shaft O. The slide 18 carries a die, 20, upon its inner end corresponding to the shoulder 7 on the fixed die, and so that as the slide 18 advances toward the fixed die 2, as indicated in broken lines, Fig. 9, the face of the die 20 will strike the projecting end of the arm *b* and turn it inward and onto the shoulder 7 of the fixed die, as indicated in broken lines, Fig. 9, thus shaping the barb *e*.

Upon the opposite side of the fixed die 2 is a slide, 21, arranged to reciprocate in a path at right angles to the slide 9, and to which reciprocating movement is imparted by a cam, 22, on the shaft F. The slide 21 carries upon its inner end a die, 23, the face of which corresponds to the bend to be produced on the barb *d*, and as it advances, as seen in broken lines, Fig. 9, it turns the point of the barb *d* inward over the shoulder 8 on the fixed die 2, as indicated in broken lines, Fig. 9. After the barbs are thus bent the two slides 18 and 21 recede, and the slide 14 also retreats, leaving the complete fastener on the fixed die 2, to which it will naturally cling by frictional contact.

Below the fixed die 2 the bed is open, and then as the slide 1 descends, downward projections 24 and 25 thereon corresponding in shape to the opposite ends of the fixed die 2, as seen in Fig. 7, strike the top of the blank and force it downward and from the fixed die, it then falling through the opening 26 in the bed. The downward projections 24 and 25 are so far below the cutters *s* on the slide that the finished fastener is removed before the wire passes inward, and so that the wire so passes inward before the cutters reach the wire. Then as the slide completes its descent the cutters sever the next blank from the wire, deposit it upon the rests *u w*, and then rise out of the way of the bending-dies, and thus continuing, the wire is fed into the machine, the blanks successively cut therefrom, shaped, and the fasteners delivered from the machine complete and ready for market.

I have represented a common and well-known wire-feed for delivering the wire to the machine; but it will be understood that any of the common and well-known feeds may be substituted therefor without departing from my invention.

While I prefer to make the bend at the end of the barb *d*, to give to it a hook-like character, so that it may take a better hold in the side of the tub or box, this bend is not essential, and in case it is not required the transverse reciprocating die 23 and the corresponding shoulder on the die 2 may be omitted.

If preferred, the blanks may be cut in an independent machine and delivered into a position between the two dies 2 and 14 by hand or otherwise. The automatic feed, therefore, while desirable, is not essential to the machine.

I claim—

1. In a machine for making the herein-described box and cover fastener, the combination of the two dies 2 and 14, arranged in the same plane, mechanism, substantially such as described, to impart reciprocating movement to one of said dies toward and from the other, a rest in a plane between said two dies, upon which the blank to be bent may be supported, the working-face of the said die 2 corresponding to the shape of the inner side of the fastener, the face of the other die, 14, corresponding to the exterior surface of the two arms and to the barb of the longer arm, and a transverse reciprocating die, 20, corresponding to the barb of the shorter arm, substantially as described.

2. In a machine for making the herein-described box and cover fastener, the combination of the two dies 2 and 14, arranged in the same plane, mechanism, substantially such as described, to impart reciprocating movement to one of said dies toward and from the other, the working-face of the die 2 corresponding to the interior surface of the fastener to be produced, the working-face of the die 14 corresponding to the exterior surface of the two arms, and with a projection corresponding to the barb at the end of the longer arm of the fastener, a transversely-reciprocating die, 20, corresponding to the barb of the shorter arm, and the transverse reciprocating die 23, corresponding to a shoulder, 8, on the die 2, and adapted to give a bend to the end of the barb of the longer arm, with a feed adapted to present a wire-blank between said two dies 2 and 14, all substantially as described.

3. In a machine for making the herein-described box and cover fastener, the combination of a feed adapted to present the wire into the machine, a die, 2, having its face of a shape corresponding to the interior surface of the fastener, the die 14, arranged in the same plane as the die 2 and having in its face a recess corresponding to the exterior surface of the two arms of the fastener, and with a projection, 17, therefrom corresponding to the barb at the end of the longer arm of the fastener, the said two dies, one fixed and the other reciprocating, and a transverse reciprocating die, 20, corresponding to the barb of the shorter arm, substantially as described.

4. In a machine for making the herein-described box and cover fastener, the combination of a feed adapted to present the wire into the machine, a pair of cutters having their cutting-edges oblique to the line of the wire, rests *u w*, upon which the blank so obliquely cut from the body of the wire will rest, a pair of dies, 2 14, arranged in the same plane, one upon one side of the blank and the other upon the opposite side, the die 2 corresponding to the interior surface of the complete fastener, the die 14 having its working-surface corresponding to the exterior of the two arms and with a projection therefrom corresponding to the barb upon the end of the longer arm, and with a transverse reciprocating die, 20, corresponding to the barb on the shorter arm, substantially as described.

5. In a machine for making the herein-described box and cover-fastener, the combination of a feed adapted to present the wire into the machine, a pair of dies, 2 14, one upon one side and the other upon the opposite side of the wire so delivered to the machine, and in the same plane, the working-face of the die 2 corresponding to the interior surface of the finished fastener, the working-surface of the other die, 14, corresponding to the two arms of the fastener, and the projection therefrom corresponding to the barb at the end of the longer arm, a vertical reciprocating slide, 1, an oblique cutter, s, on said slide, a stationary corresponding oblique cutter, h, the said two cutters being in the plane of the wire, and whereby the blank is cut obliquely from the body of the wire presented to the machine, rests u w, upon which said blank falls as it is so cut from the body of the wire, the rest w curved upward, and the said vertical slide provided with a presser, v, corresponding to said rest w, and a transversely-reciprocating die, 20, corresponding to the barb of the shorter arm, all substantially as described.

6. In a machine for making the herein-described box and cover fastener, the combination of the two dies 2 and 14, one stationary and the other reciprocating, the working-face of the die 2 corresponding in shape to the shape of the interior of the finished fastener, the face of the other die corresponding in shape to the outer surface of the two arms, and with a projection therefrom corresponding to the barb of the longer arm, the transversely-reciprocating die 20, corresponding to the barb of the shorter arm, and a vertical reciprocating slide carrying downward projections 24 and 25, adapted to work in the plane of the face of the said die 2, substantially as described, and whereby the said projections 24 and 25 serve to force the finished fastener from the die 2 before the wire is presented for the next fastener.

JOHN ADT.

Witnesses:
 JOHN E. EARLE,
 FRED C. EARLE.